No. 814,716. PATENTED MAR. 13, 1906.
A. MACDONELL.
COMBINED LAND ROLLER, FURROW OPENER, AND MARKER.
APPLICATION FILED SEPT. 16, 1905.
2 SHEETS—SHEET 1.
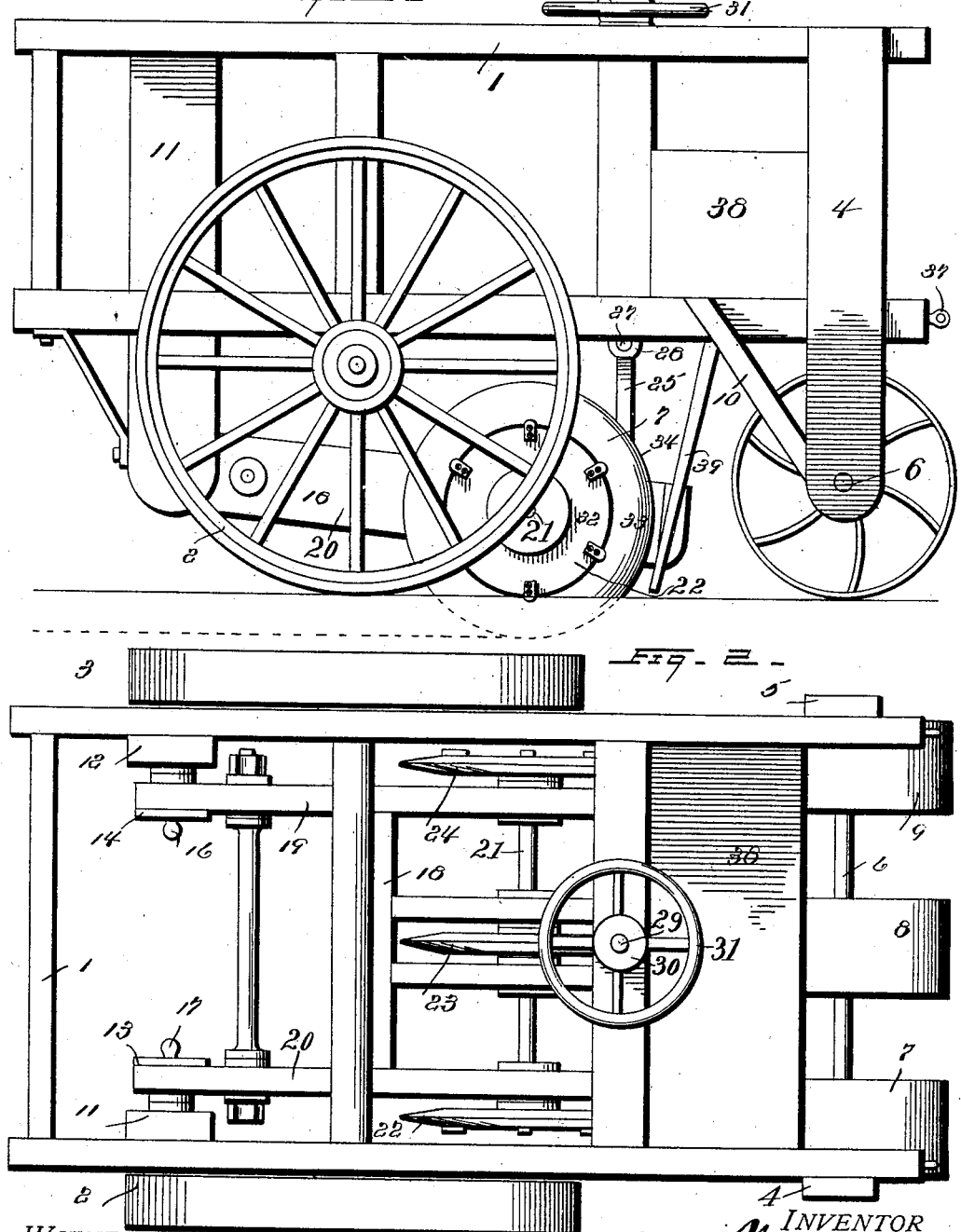

No. 814,716. PATENTED MAR. 13, 1906.
A. MACDONELL.
COMBINED LAND ROLLER, FURROW OPENER, AND MARKER.
APPLICATION FILED SEPT. 16, 1905.
2 SHEETS—SHEET 2.
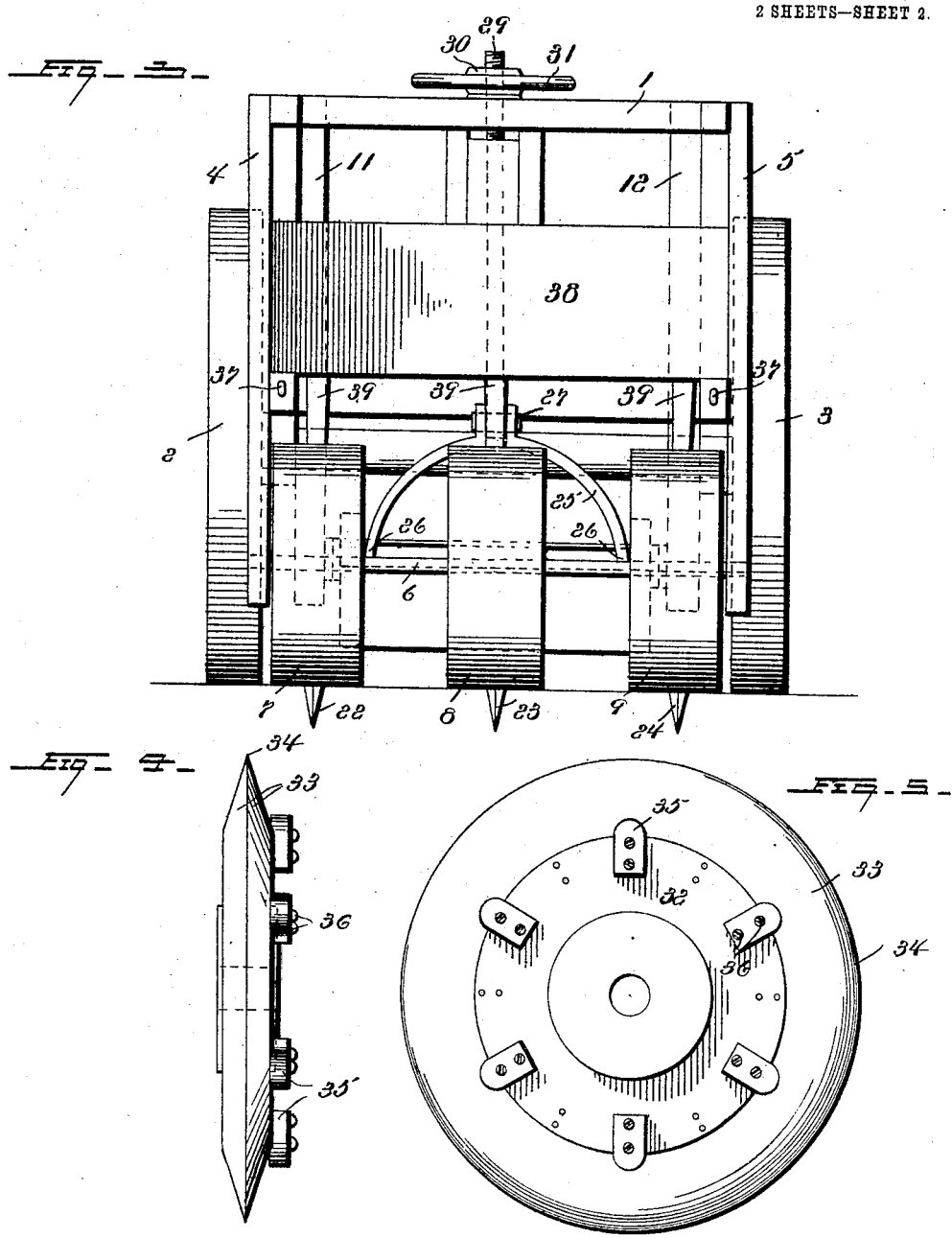

UNITED STATES PATENT OFFICE.

ALLAN MACDONELL, OF LAREDO, TEXAS.

COMBINED LAND-ROLLER, FURROW OPENER, AND MARKER.

No. 814,716.  Specification of Letters Patent.  Patented March 13, 1906.

Application filed September 16, 1905. Serial No. 278,824.

*To all whom it may concern:*

Be it known that I, ALLAN MACDONELL, a subject of the King of Great Britain and Ireland, residing at Laredo, in the county of Webb and State of Texas, have invented a new and useful Combined Land-Roller, Furrow Opener, and Marker, of which the following is a specification.

My invention relates to improvements in a combined land-roller, furrow opener, and marker, and pertains particularly to those used in planting crops in which a shallow furrow only is necessary.

The object of my invention is to provide a machine of this character by which the ground after being plowed and prepared for planting is by one operation of the machine rolled and smoothed, the furrows dug to an exact and uniform depth, and the ground marked to indicate at what point the young plants or seeds are to be planted, thus bringing the hills a specified distance apart and also providing means whereby the marking of the ground can be readily changed for bringing the hills nearer or farther apart, as desired.

Another object of my invention is to provide a more simple, cheap, and effective device of this character to produce the above results.

In the accompanying drawings, Figure 1 is a side elevation of my improved machine. Fig. 2 is a top plan view. Fig. 3 is a front end view. Fig. 4 is an enlarged edge view of one of the disk furrow-openers; and Fig. 5 is an enlarged side elevation of one of the disk furrow-openers, showing the means for attaching the markers.

Referring now to the drawings, 1 represents an elongated rectangular frame which is provided adjacent to its rear end with the wheels 2 and 3, by means of which the frame is supported. The forward end of said frame is provided with vertically-disposed standards 4 and 5, which extend below the frame and are provided with a transverse shaft 6, which is arranged parallel with the axle or spindles of the wheels. Mounted loosely on said shaft 6 are three rollers 7, 8, and 9, which are adapted to revolve independently of each other like the wheels 2 and 3, and thus making the machine easier to turn. The wheels 2 and 3 may be made of any desired structure, but preferably of a light form and having broad rims or tires to prevent them from sinking while working in the plowed ground. The said standards 4 and 5 are provided with braces 10, which prevent the standards from twisting under the strain to which they are subjected.

The rollers 7, 8, and 9 are of a broad flat form and three in number; but it is understood that any desired number of rollers may be used, and in the rear of each roller there is a furrow opener or disk, whether one or more rollers are used, as hereinafter described. The rear end of the frame 1 is provided with downwardly-extending standards 11 and 12, which extend down within about six inches of the ground, and the lower ends are provided with metal plates 13 and 14, having openings into which extend the pins 16 and 17, carried by the rear end of the swinging frame 18. The said frame 18 is of a rectangular form and provided with longitudinally-extending bars 19 and 20, and the rear ends of the bars are attached to the downwardly-extending standards 11 and 12, as heretofore described. The said frame 18 is also provided intermediate its ends with a transverse shaft 21, which is parallel with the shaft 6 and has three furrow-opening disks 22, 23, and 24, which are arranged in a line directly in the rear of the rollers 7, 8, and 9 and are adapted to cut the furrows in the ground rolled by said rollers. The said frame 18, as heretofore described, is pivoted at its rear end, and its forward end adjacent to the rollers is provided with a spring bow-bar 25, which has its ends 26 rigidly attached to the frame 18, and connected to the upper end of said bar at 27 is a link 28, which has its upper end pivotally connected at 29 to a screw 30, carried by the frame 1. The said screw is vertically movable in said frame by means of a hand-nut 31, and thus the forward end of the frame is vertically movable, so that the furrow-disks are caused to cut a deep or shallow furrow. The said disks, as shown, are formed of a main body portion 32, which is made either of wood or metal, but preferably of metal, and has its outer edge beveled on each side at 33, which forms an outer peripheral cutting edge 34 and is adapted to enter the ground and cut the furrow. These disks, it is understood, are securely fastened to the shaft 21, and the shaft is thus adapted to rotate in the frame, and the disks travel together. The said disks adjacent to or at the inner edge of the beveled portion 33 on one side are provided with laterally-extending projections 35, which, as shown, extend down slightly below the beginning of said beveled portion.

Thus the said projections are adapted to engage and enter the ground and make a small indentation therein, marking the place at equal distances apart at the side of the furrow and indicating the point at which the seeds are to be planted. It is understood that these projections 35 could be cast upon the disk; but they are preferably made as a separate part and are made of cast-iron and bolted to the disk by means of bolts 36, and any desired number may be placed upon the disk, thus increasing or decreasing the distance apart of the marks, according to the kind of planting to be done.

The front end of the frame 1 may be provided with any desired draft means, as this forms no part of my invention; but I have shown a clevis 37, by means of which it is drawn.

In operation the rollers mash the ground and crush all of the lumps directly in front of the furrow-disk, thus preparing the ground for each furrow, and the disk then cutting the furrow and marking the ground for planting. The depth of the furrow is regulated by the raising and lowering of the forward end of the frame 18, carrying the disks, as heretofore described.

The frame 1 at its forward end is provided with a tank 38, which has connected to its lower end flexible tubes 39, which extend down adjacent to the ground in front of the disk. This tank is for carrying a solution of fertilizing-salt, and thus the ground in front of each disk is supplied with the desired amount of this solution.

Having thus fully described my invention, what I claim as new, and desire to secure by Letters Patent, is—

1. A machine of the character described, comprising a frame having wheels adjacent to its rear end, rollers carried by the forward end of the frame and supporting the same, a frame pivoted adjacent to the wheels and extending forward, means for vertically adjusting the forward end of said frame, and combined furrow disks and markers carried by the forward end of said pivoted frame.

2. A machine of the character described, comprising a frame supported by wheels at its rear end, land-rollers supporting the frame at the forward end, a swinging frame within said frame, and combined furrow-opening disks and markers carried by the said swinging frame.

3. A machine of the character described, comprising a frame supported by wheels at its rear end, land-rollers supporting the frame at the forward end, a frame swingingly supported at its rear end within the wheel-supported frame, means for vertically adjusting the forward end of said swinging frame, and furrow-disks carried by the forward end of said swinging frame, and projections carried by the disks for marking the furrow and indicating the place of planting.

4. A machine of the character described, comprising a frame supported by wheels at the rear end, land-rollers supporting the frame at the forward end, a frame swingingly supported at its rear end to said frame, a link connected to the forward end of said swinging frame, a vertically-adjustable screw carried by the wheeled frame and pivotally connected to the links for vertically adjusting the forward end of said swinging frame, furrow-disks rotatably mounted in the forward end of the swinging frame, and removable projections carried by the side of the disks for marking the furrows and indicating the place of planting.

5. A furrow-opening disk, comprising a body portion having a beveled peripheral cutting edge, and projections carried by the side of said body portion.

6. A furrow-opening disk, comprising a body portion having a beveled peripheral cutting edge, and removable projections carried by the side of the said body portion.

7. A furrow-opening disk, comprising a body portion having a beveled peripheral cutting edge, and removable projections bolted to the side of the body portion.

8. A furrow-opening disk, comprising a body portion having a beveled peripheral cutting edge, and laterally-extending markers bolted to the side of the body portion adjacent to the inner end of said beveled cutting edge.

In testimony whereof I have signed my name to this specification in the presence of two subscribing witnesses.

ALLAN MACDONELL.

Witnesses:
H. G. DICKINSON,
GEO. MURPHY.